United States Patent [19]

Prater et al.

[11] Patent Number: 5,166,520
[45] Date of Patent: Nov. 24, 1992

[54] UNIVERSAL, MICROFABRICATED PROBE FOR SCANNING PROBE MICROSCOPES

[75] Inventors: Craig Prater, Goleta; Thomas B. Albrecht, San Jose, both of Calif.

[73] Assignee: The Regents of the University of California, Oakland, Calif.

[21] Appl. No.: 701,404

[22] Filed: May 13, 1991

[51] Int. Cl.$^5$ .............................................. H01J 37/26
[52] U.S. Cl. .................................... 250/306; 250/307
[58] Field of Search ...................... 250/306, 307, 309; 73/105; 324/124, 128, 164

[56] References Cited

U.S. PATENT DOCUMENTS

4,747,698  5/1988  Wickramasinghe et al. ....... 250/306
4,998,016  3/1991  Nose et al. ........................ 250/306

Primary Examiner—Jack I. Berman
Assistant Examiner—Kiet T. Nguyen
Attorney, Agent, or Firm—Oblon, Spivak, McClelland, Maier & Neustadt

[57] ABSTRACT

A universal probe which can be used with many different types of scanning probe microscopes is disclosed. The probe is mounted on a flexible base. The flexible base may either be a flexible cantilevered beam or a flexible membrane. The probe is a sharply tapered probe and forms in general a squat hollow pyramid or cone. The apex of the pyramid or cone has an aperture defined therethrough with a small controlled diameter of the order of 10 to 50,000 Angstroms. The hollow within the probe is filled with a material chosen according to the type of the scanning probe microscope used and the underlying surface. A signal is coupled to the material in the tip of the probe from the scanning probe microscope to interact with the underlying surface.

31 Claims, 4 Drawing Sheets

UNIVERSAL, MICROFABRICATED PROBE FOR SCANNING PROBE MICROSCOPES

BACKGROUND OF THE INVENTION

The goverment has rights to this invention pursuant to contract number N00014-K-0327 awarded by the U.S. Office of Naval Research. The goverment has certain rights to this invention.

This invention was made with U.S. Government support under Grant (or Contract) No. N00014-84-K-0327, awarded by the Office of Naval Research.

1. Field of the Invention

The invention relates to the field of scanning microscopes and in particular to an apparatus for an improved probe through which such scanning microscopes sense the observed or detected object scanned by the microscope.

2. Description of the Prior Art

Scanning microscopies are used in conjunction with a variety of different technologies for scanning surfaces to observe or detect submicroscopic or macroatomic elements of the surface. Such scanning probe microscopes include scanning ion conductance microscopes (SICM) such as described generally in P. K. Hansma et al, *Science* 243, 641 (1989); such as a scanning tunneling microscope (STM) as described in P. K. Hansma et al, *Science* 242, 210 (1988); such as an atomic force microscope (AFM) as described in B. Drake et al, *Science*, Mar. 24, (1989); and such other types of technologies including that described by Y. Martin, *Appl. Phys. Lett.* 50, 1455 (1987) and C. C. WILLIAMS et al, *Appl. Phys. Lett.*, 49, 1587 (1986). The invention can be used in any scanning probe microscope now known or later devised and is not limited to the illustrative list given here.

Each of these Scanning Probe Microscopes scan a surface with a variety of different sharp tips to measure some type of tip-to-surface interaction and to thereby derive information pertaining to the microscopic nature of the scanned surface. In the case of scanning tunneling microscopes a sharp metal wire, often made of tungsten or platinum-iridium is used as a probe. In the case of scanning ion conductance microscopes, a fragile glass micropipette has been used as a probe. The probe for the atomic force microscope is a spring lever having a sharp tip attached to the lever. Other types of scanning probe microscopes use even more specialized types of probes. In general, the probes used in each of these types of microscopes are not interchangeable so that an entire microscope stage must be built around, based on and limited to the nature of the available probe.

A typical prior art technique to make such tips for the scanning ion conductance microscope consisted of pulling glass pipettes apart so that their inner diameter was reduced to a few hundred Angstroms. The comparable taper of these glass tips are very long namely of the order of 1 to 10 degrees. However, the long taper which is generated as a result of this prior art process makes the probe extremely fragile and reduces the amount of light transmission through the aperture when used in a near field scanning optical microscopes (NOSM) and increases the ion impedance when used in a scanning ion conductance microscope. In addition such prior art glass pipettes have a low mechanical resonance frequency which interferes with signal detection from the scanned surface.

One particular variety of probes for atomic force microscopes is based upon microfabricated cantilevers such as described by T. R. Albrecht, *J. Vac. Sci. Technol.* A6, 271 (1988). These cantilevers are fabricated with tapered tips grown on to the end of a cantilever. A tapered tip and springy cantilever allows the sharp taper to give strength to the probe while still allowing the tip to taper to a very sharp and fine point which otherwise would be extremely fragile. In addition, the tip can harmlessly deflect in the case of a collision with a surface feature when mounted on the tip of a flexible cantilever. Finally, such probes can be microfabricated in large quantities and need not be built by hand on a one-at-a-time basis as is currently common. Other prior art probes, which neither have a sharp taper nor the ability to generally deflect away from a collision, are often damaged or cause the surface to be damaged in the event of a collision. Nonetheless, flexible cantilever probes are specifically made for one type of scanning technology and are not adaptable for universal use in different types of scanning probe microscopes.

Therefore, what is needed is some type of universal tip for scanning probe microscopes which can capitalize on the advantages known for tapered cantilevered tips, can be strongly built, but still present a fine and sharp point, have the ability to harmlessly deflect in the case of a collision with a surface feature, be fabricated in large quantities, and be usable in different types of scanning probe microscopes.

BRIEF SUMMARY OF THE INVENTION

The invention is a universal probe for use with scanning probe microscopes based on different scanning technologies to scan an underlying surface. The invention comprises a mounting element for providing a flexible base. A sharply tapered hollow tip, having an apex, is disposed on the mounting element. An aperture is defined through the apex of the tip. The aperture size is chosen to fit a given application. A selected material fills the hollow tip so that interaction of the material within the hollow tip through the aperture with the underlying surface is effectuated. The material is selected according to the interaction used by the scanning probe microscope to scan the underlying surface. As a result, the probe is utilized in combination with a plurality of technologies in combination with the scanning probe microscope.

The mounting element has a standardized shape so that the probe may be changed without redesign of the scanning probe microscope by substituting an identically shaped probe having a different material filling the hollow tip.

In one embodiment the mounting element is a cantilever. The cantilever is a pair of beams formed into a integral V-shape. In another embodiment the cantilever is a beam cantilever. In still another embodiment the element for providing a flexible base is a flexible membrane. The flexible membrane is integrally fabricated with the tapered tip.

The hollowed tapered tip has a side surface and an axis defined as extending through the aperture. The side surface makes an angle with respect to the axis of more than 10 degrees, typically an angle of more 35-70 degrees.

The aperture has a diameter of any size, although in some embodiments the diameter is less than 100 Angstroms.

The hollow tapered tip is of any shape including pyramidal or conical and has a cavity defined therein.

This shape and those equivalent thereto may hereinafter be termed a "tapered prism". In one embodiment the material filling the hollow tapered tip is a conductive metal disposed in the tapered tip and electrically coupled with the scanning probe microscope.

The element for filling the hollow tapered tip completely fills the tip and provides an exposed surface of the material at the aperture. The conductive metal can be further etched to extend from the aperture in a sharp tip. The conductive metal also can be hardened. In another embodiment the conductive metal is magnetic. Where desired the conductive metal may be electrically grounded.

In another embodiment the element for filling the hollow tapered tip is an electrolyte.

The conductive metal is a layer plated within the hollow tapered tip and further comprises at least one additional layer of a different type of metal plated within the hollow tapered tip to form a temperature probe.

The invention may be better visualized by now turning to the following drawings wherein like elements are referenced by like numerals.

The invention and its various embodiments are now better understood by turning to he following detailed description.

DETAILED DESCRIPTION OF THE PREFERRED EMBODIMENTS

A universal probe which can be used with many different types of scanning probe microscopes is disclosed. The probe is mounted on a flexible base. The flexible base may either be a flexible cantilevered beam or a flexible membrane. The dimensions of the base may be varied to vary the flexibility of the base and its mechanical resonant frequency. The probe is a sharply tapered probe and forms in general a squat hollow pyramid or cone. In the following where the term "taper" is used, it shall be understood to mean pyramid or cone, or equivalent shapes. The apex of the pyramid or cone has an aperture defined therethrough with a small controlled diameter of the order of 10 to 50,000 Angstroms. The hollow within the probe is filled with a material chosen according to the type of the scanning probe microscope used and the underlying surface. A signal is coupled to the material in the tip of the probe from the scanning probe microscope to interact with the underlying surface.

What is described below is a probe for a scanning probe microscope for scanning an underlying surface comprising a sharply tapered tip. The tip has a base and a height. The height of the tip is of the order of the base or less. A bore is defined through the tip. The tip has an apex. The bore is defined through the apex to define an aperture at the apex. An element is provided for flexibly mounting the tip so that collisions of the tip with the underlying surface result in deflection of the tip without substantial damage to the tip or to the underlying surface. An interactive material is disposed in the bore and exposed by the aperture at the apex of the tip. The interactive material is selectively chosen to interactively couple with the underlying surface when appropriate signals are applied from the scanning probe microscope. The material is coupled to the scanning probe microscope so that interaction through the material with the underlying surface is detected when scanning with the scanning probe microscope.

The probe is standardized in shape and size for coupling with a plurality a different types of the scanning probe microscopes. The material is selectively chosen according to the technology utilized by the scanning probe microscope to which the probe is connected.

Figure 1:
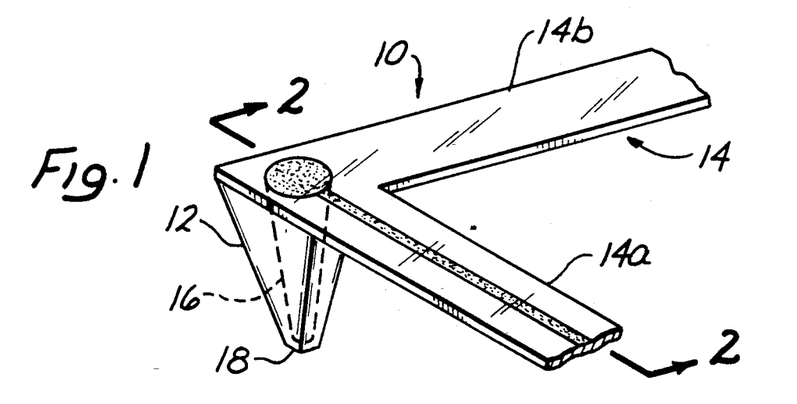
FIG. 1 is a simplified diagram of a cantilever probe incorporating the invention.

The invention incorporates the advantages of microfabricated atomic force cantilevers such as described in T. R. Albrecht, *J. Vac. Sci. Technol.* A6, 271 (1988) into probes usable in other types of scanning microscopes. FIG. 1 illustrates a prospective view of one embodiment of the invention shown in greatly enlarged scale. The probe tip, generally denoted by reference numeral 10, is comprised of a hollowed tapered tip 12 mounted on or integrally formed with a spring lever or cantilever 14. In the embodiment of FIG. 1 cantilever 14 is comprised of two arms 14a and 14b joined at a V-shaped apex. The opposing ends of arms 14a and 14b are connected to the mechanism of the microscope scanning stage, which is conventional in the art, forms no material part of the invention, and has thus not been shown for the sake of clarity and emphasis on the improvement which comprises the invention.

Hollow tip 12 is shown as generally having an exterior taper and having an interior tapered cavity 16. A very fine hole 18 is defined at the apex end of tip 12, which hole 18 is typically 10-50,000 Angstroms in diameter.

Figure 2:
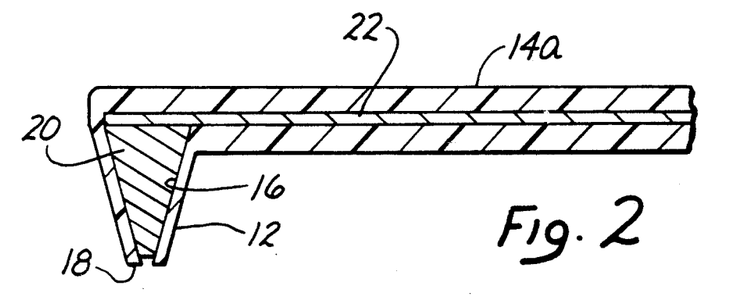
FIG. 2 is a cross-sectional view of the probe of FIG. 1 as seen through lines 2—2 of FIG. 1.

A side sectional view as seen through lines 2—2 of FIG. 1 is illustrated in FIG. 2. Hollow tip 12 may be filled with a variety of materials that specifically adapt probe tip 10 to the specific application or scanning technology with which it is used. For example, cavity 16 may be filled with metals, semiconductors or electrolyte to provide a conducting channel. Conducting material 20 filling cavity 16 is connected or integrally extends through a conducting line 22 defined on or within cantilever arm 14a and extends back to the scanning stage of the microscope ultimately coupling to the detection circuitry of the microscope.

As will be described below the structure of probe tip 10 is fabricated from silicon or silicon compounds such as silicon-oxide or silicon-nitride. The manufacturing techniques for fabricating spring levers are well developed and described in T. R. Albrecht, *Journal of Vacuum Science Tech.* 86, 271 (1988).

In other applications, universal probe tip 10 of FIGS. 1 and 2 could be filled with metal etched to a sharp point to form a scanning tunnelling microscope tip that can be used in conductive fluids. The very small diameter of hole 18 allows a scanning tunneling microscope to run with very small Faradaic currents, i.e. currents leaking into the electrolyte through the small metal tip exposed to the electrolyte.

Still another embodiment of probe tip 10 of FIGS. 1 and 2 is devised by filling cavity 16 with a hard metal, such as tungsten, for use in a grounded tip atomic force microscope. It is often desirable to electrically ground an atomic force microscope tip to eliminate or better control or measure electrostatic forces on the tip and cantilever.

Still further, the universal probe tip of FIGS. 1 and 2 could be adapted for use with a magnetic force microscope such as described by Y. Martin et al, *Appl. Physics Letters* 50, 1455 (1987); and H. J. Mamin, *Appl. Physics Letters* 53, 1563 (1988). In this embodiment, cavity 16 is filled with a magnetic metal, such as nickel, which is then used as a magnetic force sensor in the magnetic force microscope.

In another embodiment probe tip 10 of FIGS. 1 and 2 could be filled with conducting material and encapsulated in a glass layer to be used as the scanning electrode in the scanning electrochemical microscope as described by A. J. Bard et. al., *Annal. Chem.*, 61, 132 (1989).

The universal probe tip of FIGS. 1 and 2 could also be sealed with a permeable plymer plug and attached to a mass spectrometer for use in a scanning micropipette molecule microscope such as described by J. A. Jarrell et. al., *Science* 211, 277 (1981).

Yet another embodiment of probe tip 10 of FIGS. 1 and 2 uses two different metals plated within the cavity of hollow tip 12 to form a microfabricated temperature probe in a scanning thermal profiler such as described by C. C. Williams et al, *Appl. Physics Letters* 49, 1587 (1986).

It is also within the scope of the present invention that instead of using a V-shaped cantilever or a simple cantilevered beam analogous to that shown in FIGS. 1 and 2, the invention may also fabricated in the form of a tapered tip on a larger support, such as glass pipette which would be provided with a thin support membrane, which is capable of flexing like a drumhead, so that the tip could still deflect harmlessly away from the surface in the case of a collision.

All of these embodiments share the property that the sharply tapered tip 12 offers much greater strength than a cylindrical tip or a tip with a slow taper, but still allows the tip to have a very small opening 18 or sharp point. By mounting the tip on a flexible cantilever or membrane, probe 10 and tip 12 can harmlessly deflect in the case of a collision with a surface feature.

In any embodiment, adapting probe 10 from one application to another is accomplished by filling the cavity in tip 12 with a material, which may be solid, liquid, or even gaseous, and adding electrical leads or other sensing means in connection with the material in the filled cavity 16 as is necessary and appropriate.

The general shape and dimensions of probe 10 in each embodiment remain the same allowing the microscope and microscope stage design to become standardized among the many different technologies used for scanning probe microscopes. For example, atomic force microscope could be quickly converted to a scanning ion conductance microscope and back again simply by changing the particular probe and connecting the appropriate electrical leads. In each case, the probe would be effectively identical in its outside geometric configuration and characteristics insofar as its mechanical and electrical connection to the microscope were concerned. Probe 10 then becomes universal and can be interchanged with many different types of scanning probe microscopes without necessitating any design changes in them.

Figure 3:
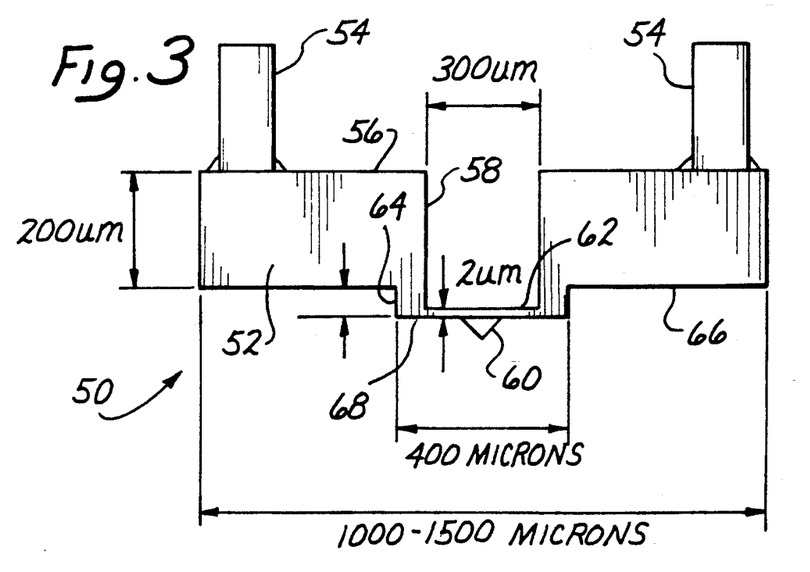
FIG. 3 is a simplified side sectional view of another embodiment of the invention wherein the tip is mounted on a membrane.

Another embodiment of the invention is shown in FIG. 3 wherein tip assembly 50 is comprised of a base 52 of silicon approximately 200 microns thick. A glass pipette 54 is fixed by epoxy to rear surface 56 of base 52. A cavity 58 is defined into base 52 which cavity is about 300 microns across. The bottom of cavity 58 is covered by a 2 micron thick layer 62 of silicon integral with base 52. Base 52 is formed to define a pedestal 64 projection below the front surface 66 of base 52 by approximately 30–50 microns. Pedestal 64 is about 400 microns across. Tapered tip 60 is formed on layer 62 on the front surface 68 of pedestal 64. Thus tip 60 is mounted on a membrane which in the illustrated embodiment has a force constant of about 1 N/m and a resonant frequency of about 20 kHz. It is expressly contemplated that the dimensions of tip assembly 50 can be varied to vary the force constant and resonant frequency of the tip according to the given application.

The present invention is directed to the structure and design of the universal probe 10 and not particularly to its preferred methods of manufacture which were developed by others, see T. R. Albrecht, supra. For the purposes of completeness, however, the presently preferred methods of manufacture will be described in connection with FIGS. 4a–d and 5a–g.

The method of fabrication shown in FIG. 4 was developed by T. R. Albrecht, S. Akamine and M. Tortonese. In FIG. 4a the fabrication process begins with etching a sharp pyramidal pit 22 in an <100> oriented silicon substrate 24. Preferential etching of pyramidal pits in crystalline silicon is well known in the prior art and can, for example, be etched with potassium-hydroxide.

A thin thermal oxide layer 26 is then grown on top of the surface of substrate 24 including within pit 22. This oxide is grown at a temperature of 1000° C. or less, which results in a nonuniform oxide thickness as described by Da-Bin Kao, Ph.D. thesis, Department of Electrical Engineering, Stanford University (1986), incorporated herein by reference. Under the oxide growth conditions described above, the oxide layer is thinnest at the apex 28 of pit 22.

Figure 4A:
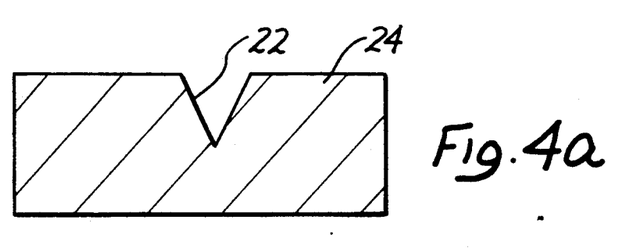
FIGS. 4a-4d illustrate one methodology whereby the probe of FIGS. 1 and 2 can be fabricated.
Figure 4B:
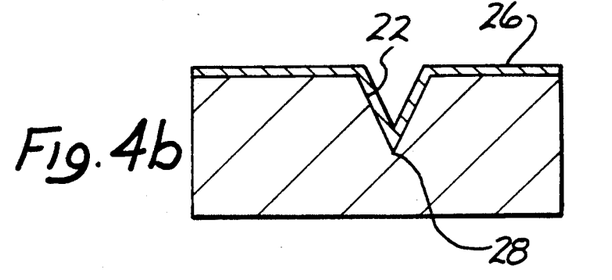
Figure 4C:
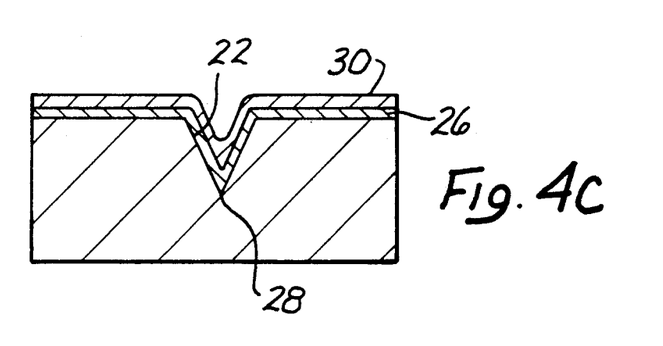
Figure 4D:
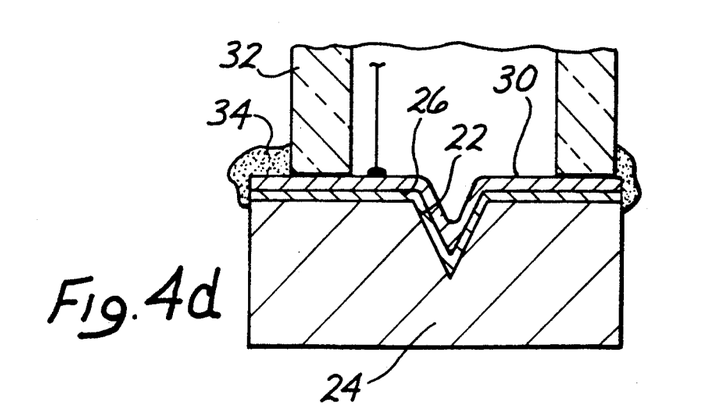

A metal layer 30 is then deposited on top of oxide layer 26 and into the oxide covered pit 22 as shown in FIG. 4c. The prepared substrate can then be attached to an external support, such as a glass micropipette 32 by means of glue or adhesive 34, as shown in FIG. 4d. The substrate is then immersed in an etchant to remove all of the silicon substrate 24, leaving oxide film 26 exposed. Then the structure is immersed in a weak hydrofluoric acid solution, which slowly etches away the oxide film 26. Since the oxide film 26 is thinnest at the apex 28 of pit 22 as described above, the etchant penetrates the oxide first at the apex. The etch is terminated by sensing an electrical current through this hole and withdrawing from the etchant bath. The termination time of the etch can be calibrated to leave a tiny hole at apex 28 of a diameter in the range of 10 to 1000 Angstroms.

Figure 5A:
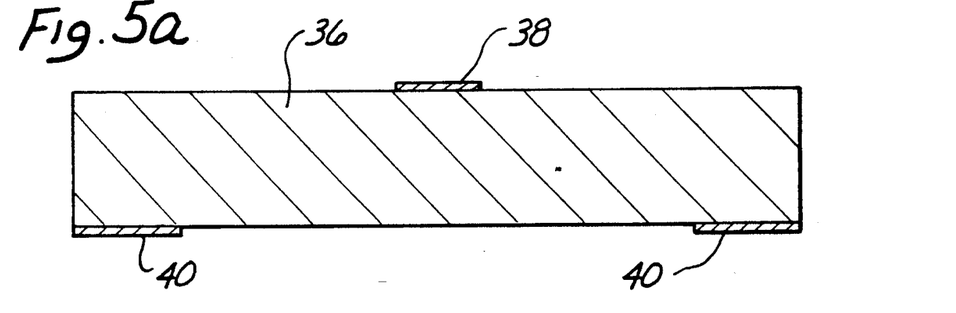
FIGS. 5a-5g illustrate another methodology whereby an alternative embodiment of the probe utilizing a diaphragm base may be fabricated. Another alternative embodiment is depicted in FIG. 5g.
Figure 5B:
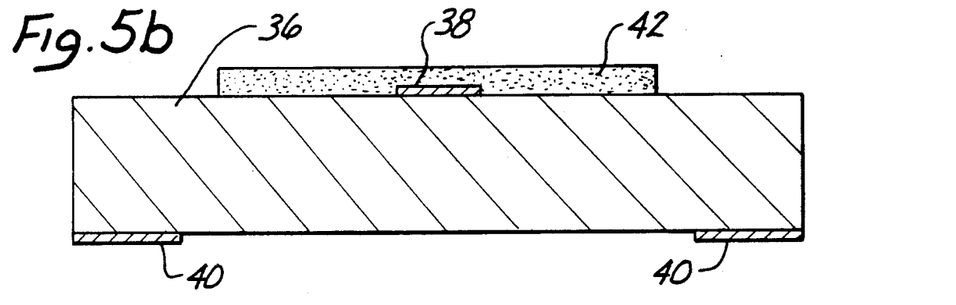
Figure 5C:
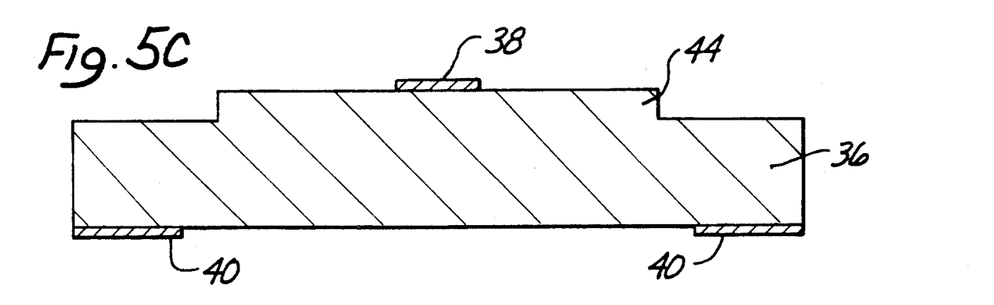
Figure 5D:
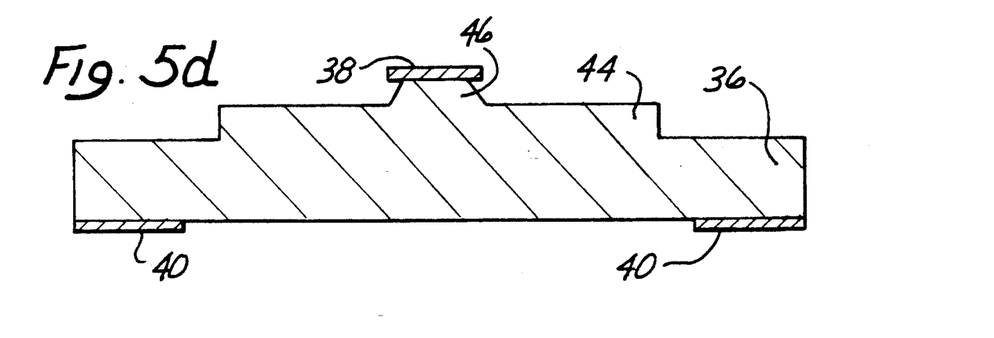

Another methodology of manufacturing the probe, which was developed by M. Tortonese, is shown in connection with FIG. 5. Again the method of manufacturing forms no part of the present invention, but is described for completeness of disclosure. FIG. 5a shows a crystallographically oriented wafer 36 of silicon with its normal along the crystallographic direction <100>. A patterned oxide layer 38 is disposed on the front surface of substrate 36 and oxide layers 40 on its rear surface. Oxide layers 38 and 40 are selectively formed by conventional photolithographic processes. Photoresist is then spun on the front side of substrate 36 and selectively patterned to form a photoresist layer 42 as shown in FIG. 5b. Again the technology for selectively forming photoresist layer 42 is conventional. A dry silicon etch is performed on the front surface of substrate 36 to form a silicon post 44 and photoresist layer 42 is then removed leaving the structure shown in FIG. 5c. A dry silicon etch is continued on the front side of substrate 36 until the material underlying layer 38 is undercut to form a silicon pyramid or cone 46 as shown in FIG. 5d.

Figure 5E:
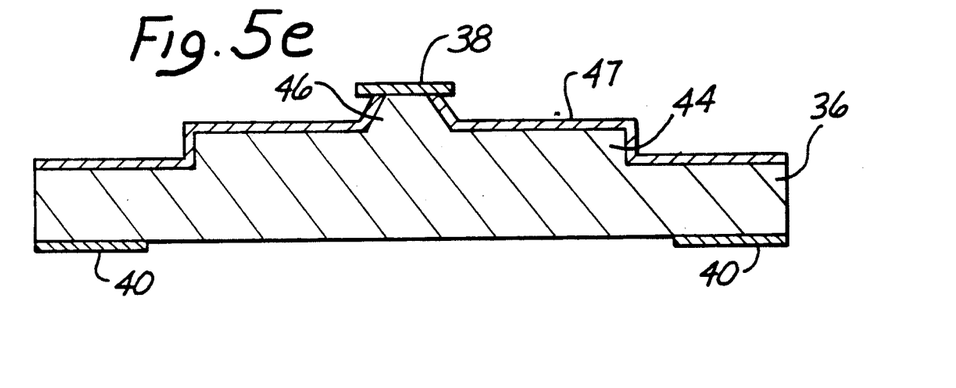
Figure 5F:
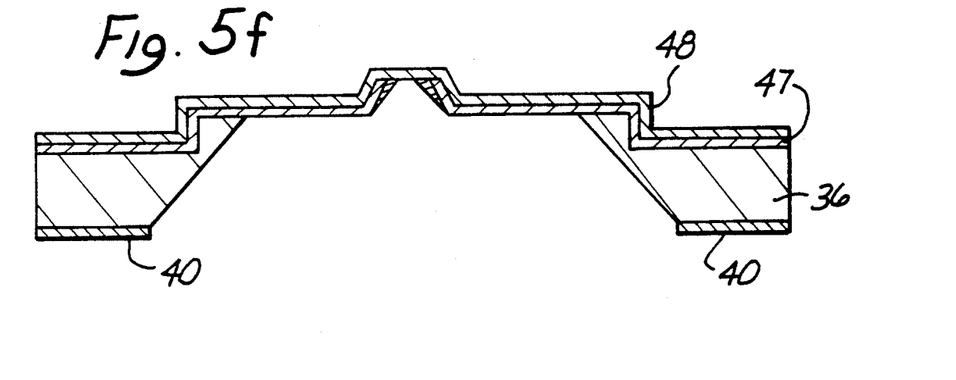

At this point boron is diffused into the upper surface of substrate 36 as depicted in FIG. 5e. Therefore, the upper surface of substrate 36, except for the portion lying directly under oxide layer 38 is differentiated from the remaining portion of substrate 36 by the boron fusion. A heavily doped layer 47 is thus defined everywhere on the upper surface of substrate 36 as depicted in FIG. 5e, except under oxide layer 38. Oxide layer 38 is moved from the front side of substrate 36 and an oxide layer 48 is disposed over the entire front side surface. The prepared substrate is then subjected to an anisotropic silicon etchant, which leaves a silicon membrane with a hollow pyramid or cone and a hole at its tip as shown in FIG. 5f. The properties of the anisotropic silicon etchant are such that the etch rate in the <111> silicon plane is much slower than the etch rate in the <100> plane. The highly boron doped silicon layer 47 also etched at a much slower rate than the undoped silicon.

Figure 5G:
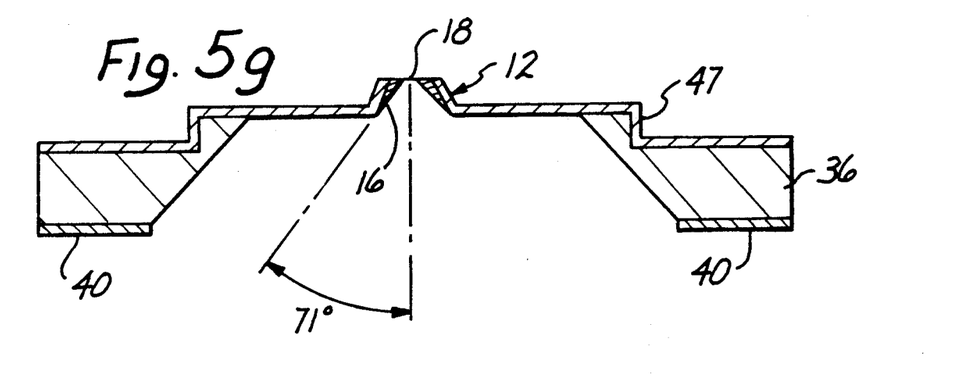

Oxide layer 48 is then removed leaving aperture 18 to find at the tip of pyramid or cone 12. The minimum diameter of aperture 18 is limited only by the accuracy with which the photomasks can be defined and the etching process controlled. The size of the aperture is controlled and reduced by using electron beam deposition of carbon in a scanning electron microscope (SEM). In this case the embodiment of FIGS. 5a-g form a flexible membrane for hollow tip 12 as opposed to the cantilevered version depicted in FIGS. 1 and 2. The membrane is comprised of the thin boron doped silicon layer 47 which is unsupported by the underlying remaining etched silicon. The taper of cavity 16 shown in FIG. 5g is crystallographically determined to be 35 degrees with respect to the vertical.

Many modifications and alterations may be made by those having ordinary skill in the art without departing from the spirit and scope of the invention. Therefore it must be expressly understood that the illustrated embodiments have been shown only for the purposes of example and clarity and should not be taken as limiting the invention which is defined by the following claims. The following claims are to be read to include not only the full scope of their literal meaning, but all equivalents for performing substantially the same function in substantially the same way to obtain substantially the same result.

I claim:

1. A universal probe for use with scanning probe microscopes based on different scanning technologies to scan an underlying surface comprising:
    mounting means for providing a flexible base;
    a sharply tapered hollow tip having an apex, said tip disposed on said mounting means;
    an aperture defined through said apex of said tip, said aperture having a predetermined diameter; and
    a selected material filling said hollow tip so that interaction of said material within said hollow tip through said aperture with said underlying surface is effectuated, said selected material being selected according to said interaction used by said scanning probe microscope to scan said underlying surface, whereby said probe is utilized in combination with a plurality of technologies in combination with said scanning probe microscope.

2. The probe of claim 1 wherein said mounting means for providing said flexible base has a standardized shape so that said probe may be changed without redesign of said scanning probe microscope by substituting an identically shaped probe having a different material filling said hollow tip.

3. The probe of claim 1 wherein said mounting means for providing a flexible base is a cantilever.

4. The probe of claim 3 wherein said cantilever is a pair of beams formed into a integral V-shape.

5. The probe of claim 3 wherein said cantilever is a beam cantilever.

6. The probe of claim 1 wherein said means for providing a flexible base is a flexible membrane.

7. The probe of claim 6 wherein said flexible membrane is integrally fabricated with said tapered tip.

8. The probe of claim 6 said flexible membrane is characterized by a plurality of dimensions determining its flexibility and resonant frequency, said plurality of dimensions being selectively chosen to derive a correspondingly selected flexibility and resonant frequency for said probe.

9. The probe of claim 3 wherein said mounting means for providing said flexible base has a standardized shape so that said probe may be changed without redesign of said scanning probe microscope by substituting an identically shaped probe having a different material filling said hollow tip.

10. The probe of claim 4 wherein said mounting means for providing said flexible base has a standardized shape so that said probe may be changed without redesign of said scanning probe microscope by substituting an identically shaped probe having a different material filling said hollow tip.

11. The probe of claim 6 wherein said mounting means for providing said flexible base has a standardized shape so that said probe may be changed without redesign of said scanning probe microscope by substituting an identically shaped probe having a different material filling said hollow tip.

12. The probe of claim 1 wherein said hollowed tapered tip has a side surface and an axis defined as extending through said aperture, said side surface making an angle with respect to said axis of more than 10 degrees.

13. The probe of claim 12 wherein said side surface makes an angle with respect to said axis of more than 60 degrees.

14. The probe of claim 13 wherein said side surface makes an angle with respect to said aperture of more than 70 degrees.

15. The probe of claim 1 wherein said aperture has a diameter of less than or equal to 50,000 Angstroms.

16. The probe of claim 15 wherein said aperture has a diameter of less than or equal to 100 Angstroms.

17. The probe of claim 1 wherein said hollow tapered tip has a tapered cavity defined therein.

18. The probe of claim 1 wherein said material filling said hollow tapered tip is a conductive metal disposed in said tapered tip and electrically coupled with said scanning probe microscope.

19. The probe of claim 1 wherein said selected material filling said hollow tapered tip fills said tip and provides an exposed surface of said material at said aperture.

20. The probe of claim 1 wherein said selected material filling said hollow tapered tip is an electrolyte.

21. The probe of claim 18 wherein said conductive metal is hardened for use in an atomic force microscope.

22. The probe of claim 18 wherein said conductive metal is electrically grounded.

23. The probe of claim 18 wherein said conductive metal is magnetic.

24. The probe of claim 18 further comprising a glass encapsulating layer disposed over said tapered tip and wherein said conductive metal is used as a scanning electrode in an electrochemical microscope.

25. The probe of claim 18 further comprising a polymer plug, and wherein said hollow tapered tip is sealed with said polymer plug and used as a molecule probe.

26. The probe of claim 18 wherein said conductive metal is a layer plated within said hollow tapered tip and further comprising at least one additional layer of a different type of metal plated within said hollow tapered tip to form a temperature probe.

27. An improved probe for use with scanning probe microscopes comprising:
    means for providing a flexible base;
    a sharply tapered hollow tip having an apex, coupled to said means for providing a base;
    an aperture defined through said apex of said tip, said aperture having a predetermined diameter;
    a preselected material filling said hollow tip so that interaction of said material within said hollow tip through said aperture with an underlying surface to be scanned by said scanning probe microscope is made possible, said hollow tapered tip being a tapered prism and having a tapered prismatic cavity defined therein; and
    wherein said means has a standardized shape so that technology used by said scanning probe microscope may be changed without redesign of said scanning probe microscope by utilizing a different material for filling said hollow tip,
    whereby said improved probe is utilized in combination with a plurality of technologies in combination with said scanning probe microscope.

28. The probe of claim 27 wherein said means for providing a flexible base is a flexible membrane.

29. The probe of claim 27 wherein said means for providing a flexible base is a cantilever.

30. A probe for a scanning probe microscope for scanning an underlying surface comprising:
    a sharply tapered tip, said tip having a base and a height, said height of said tip being of the order of said base or less;
    a bore defined through said tip, said tip having an apex, said bore being defined through said apex to define an aperture at said apex;
    means for flexibly mounting said tip so that collisions of said tip with said underlying surface result in deflection of said tip without substantial damage to said tip or to said underlying surface; and
    interactive material disposed in said bore and exposed by said aperture at said apex of said tip, said interactive material being selectively chosen to interactively couple with said underlying surface when appropriate signals are applied from said scanning probe microscope, said material being coupled to said scanning probe microscope so that interaction through said material with said underlying surface is detected when scanning with said scanning probe microscope.

31. The probe of claim 30 wherein said probe is standardized in shape and size for coupling with a plurality a different types of said scanning probe microscopes, said material being selectively chosen according to the technology utilized by said scanning probe microscope to which said probe is connected.

* * * * *

UNITED STATES PATENT AND TRADEMARK OFFICE
CERTIFICATE OF CORRECTION

PATENT NO. : 5,166,520
DATED : November 24, 1992
INVENTOR(S) : Craig Prater, et. al.

It is certified that error appears in the above-indentified patent and that said Letters Patent is hereby corrected as shown below:

On the Title page, item [75], inventors: "Thomas B. Albrecht" should be --Thomas R. Albrecht--.

Column 1, line 7, delete N00014-K-0327" and insert --N00014-84-K-0327--;

line 20, delete "microscopies" and insert --microscopes--;

Column 2, line 62, delete "more" and insert --between--.

Column 3, line 40, after "to" insert --the--.

Column 5, line 36, after "also" insert --be--.

Signed and Sealed this

Twenty-first Day of December, 1993

Attest:

BRUCE LEHMAN

*Attesting Officer*    *Commissioner of Patents and Trademarks*